US010119789B2

(12) United States Patent
Sloman

(10) Patent No.: US 10,119,789 B2
(45) Date of Patent: Nov. 6, 2018

(54) SENSING AND RESPONDING TO AN EXPLOSION LOCAL TO A VEHICLE

(71) Applicant: ADVANCED BLAST & BALLISTIC SYSTEMS LTD, Derby (GB)

(72) Inventor: Roger Mark Sloman, Derbyshire (GB)

(73) Assignee: ADVANCED BLAST & BALLISTIC SYSTEMS LTD, Derby (GB)

( * ) Notice: Subject to any disclaimer, the term of this patent is extended or adjusted under 35 U.S.C. 154(b) by 0 days.

(21) Appl. No.: 15/115,208

(22) PCT Filed: Jan. 30, 2015

(86) PCT No.: PCT/GB2015/050256
§ 371 (c)(1),
(2) Date: Jul. 28, 2016

(87) PCT Pub. No.: WO2015/114376
PCT Pub. Date: Aug. 6, 2015

(65) Prior Publication Data
US 2016/0341525 A1 Nov. 24, 2016

(30) Foreign Application Priority Data
Jan. 31, 2014 (GB) .................................. 1401720.6

(51) Int. Cl.
*F41H 5/007* (2006.01)
*F41H 7/04* (2006.01)
(Continued)

(52) U.S. Cl.
CPC ............. *F41H 5/007* (2013.01); *B62D 37/04* (2013.01); *F41H 7/042* (2013.01); *H01H 35/146* (2013.01)

(58) Field of Classification Search
CPC ....... F41H 5/007; F41H 7/042; H01H 35/146; B62D 37/04
See application file for complete search history.

(56) References Cited

U.S. PATENT DOCUMENTS 3,794,794 A * 2/1974 Provancher ......... B60R 21/0136
200/300
5,378,864 A 1/1995 Olivier et al.
(Continued)

FOREIGN PATENT DOCUMENTS

EP 2577216 A1 4/2013
WO WO-90/03040 A1 3/1990
(Continued)

OTHER PUBLICATIONS

International Search Report and Written Opinion for International Application No. PCT/GB2015/050256, dated Jun. 29, 2015.

*Primary Examiner* — Peter D Nolan
(74) *Attorney, Agent, or Firm* — Marshall, Gerstein & Borun LLP

(57) ABSTRACT

A vehicle and a sensor for use in the vehicle is disclosed. The vehicle includes: a sensor array configured to detect an explosion by sensing, at different heights within a base of the vehicle, mechanical deformation of the base of the vehicle caused by the explosion; and control circuitry configured to respond to detection of the explosion by causing a groundwards force to be applied to the vehicle that depends upon inputs, characterizing the explosion, provided by the sensor array. The sensor includes: at least one support; a first frangible electrical connection, for conveying an electrical signal, held by the at least one support at a first height; and a second frangible electrical connection, for conveying an electrical signal, held by the at least one support at a second height different from the first height.

22 Claims, 13 Drawing Sheets

(51) Int. Cl.
*H01H 35/14* (2006.01)
*B62D 37/04* (2006.01)

(56) References Cited

U.S. PATENT DOCUMENTS

| | | | |
|---|---|---|---|
| 5,910,766 A | 6/1999 | Evans | |
| 6,698,272 B1 | 3/2004 | Almirante | |
| 8,739,676 B2 * | 6/2014 | Ames | F41H 7/044 342/70 |
| 9,109,860 B2 * | 8/2015 | Welker | F41H 11/00 |
| 9,163,911 B2 * | 10/2015 | Sloman | F41B 9/0087 |
| 9,311,271 B2 * | 4/2016 | Wright | G07C 5/008 |
| 9,346,427 B2 * | 5/2016 | Dobriski | F42D 5/04 |
| 9,633,487 B2 * | 4/2017 | Wright | G07C 5/008 |
| 2003/0156036 A1 * | 8/2003 | Stuetzler | B60R 21/0136 340/665 |
| 2005/0230176 A1 * | 10/2005 | Wang | B60R 21/0132 180/282 |
| 2009/0306857 A1 * | 12/2009 | Katz | B60R 21/0136 701/45 |
| 2011/0245994 A1 * | 10/2011 | Sloman | F41H 7/02 701/1 |
| 2012/0239247 A1 * | 9/2012 | Eridon | B60R 21/01 701/36 |
| 2012/0319857 A1 * | 12/2012 | Brazier | F16K 17/16 340/679 |
| 2013/0204496 A1 * | 8/2013 | Sloman | F41B 9/0087 701/45 |
| 2013/0328713 A1 * | 12/2013 | Svane | F41H 7/02 342/70 |
| 2014/0096672 A1 * | 4/2014 | Ames | F41H 7/044 89/36.08 |
| 2014/0214281 A1 * | 7/2014 | Welker | F41H 11/00 701/45 |
| 2014/0224110 A1 | 8/2014 | Sagebiel et al. | |
| 2015/0251616 A1 * | 9/2015 | Dobriski | F42D 5/04 701/45 |
| 2016/0116256 A1 * | 4/2016 | Sloman | F41B 9/0087 180/274 |
| 2016/0189442 A1 * | 6/2016 | Wright | G07C 5/008 701/33.2 |
| 2017/0103342 A1 * | 4/2017 | Rajani | G06N 99/005 |

FOREIGN PATENT DOCUMENTS

WO    WO-2011148118 A1 *    12/2011          F41B 9/0087
WO    WO-2012/085138 A1    6/2012

* cited by examiner

SENSING AND RESPONDING TO AN EXPLOSION LOCAL TO A VEHICLE

TECHNOLOGICAL FIELD

Embodiments of the present invention relate to sensing and responding to an explosion local to a vehicle. In particular, they relate to sensing an explosion local to a vehicle and responding to the explosion by causing a groundwards force to be applied to the vehicle.

BACKGROUND

An explosive event can cause significant trauma to a vehicle and/or a vehicle's occupants. In order to protect the occupants of the vehicle from shrapnel and blast emanating from an explosive such as a bomb, mine or improvised explosive device (IED), some vehicles comprise armour.

The armour may protect the occupants against injury caused directly from the shrapnel and blast effects. However, depending upon the size of the explosive, some aspects of the vehicle (such as the floor of the vehicle if the explosion occurs underneath the vehicle) can be very heavily damaged. Furthermore, an explosion underneath or to the side of a vehicle may cause the vehicle to accelerate rapidly into the air, resulting in injury to the occupants either when being accelerated upwards or when the vehicle lands on the ground.

BRIEF SUMMARY

According to various, but not necessarily all, embodiments of the invention there is provided a vehicle, comprising: a sensor array configured to detect an explosion by sensing, at different heights within a base of the vehicle, mechanical deformation of the base of the vehicle caused by the explosion; and control circuitry configured to respond to detection of the explosion by causing a groundwards force to be applied to the vehicle that depends upon inputs, characterising the explosion, provided by the sensor array.

According to various, but not necessarily all, embodiments of the invention there is provided a vehicle, comprising: sensing means for detecting an explosion by sensing, at different heights within a base of the vehicle, mechanical deformation of the base of the vehicle caused by the explosion; and means for responding to detection of the explosion by causing a groundwards force to be applied to the vehicle that depends upon inputs, characterising the explosion, provided by the sensing means.

According to various, but not necessarily all, embodiments of the invention there is provided an apparatus, comprising: a sensor array configured to detect an explosion by sensing, at different heights within a base of a vehicle, mechanical deformation of the base of the vehicle caused by the explosion; and control circuitry configured to respond to detection of the explosion by causing a groundwards force to be applied to the vehicle that depends upon inputs, characterising the explosion, provided by the sensor array.

According to various, but not necessarily all, embodiments of the invention there is provided an apparatus, comprising: a sensing means for detecting an explosion by sensing, at different heights within a base of a vehicle, mechanical deformation of the base of the vehicle caused by the explosion; and means for responding to detection of the explosion by causing a groundwards force to be applied to the vehicle that depends upon inputs, characterising the explosion, provided by the sensing means.

According to various, but not necessarily all, embodiments of the invention there is provided a method, comprising: detecting an explosion by sensing, at different heights within a base of a vehicle, mechanical deformation of the base of the vehicle caused by the explosion; and responding to detection of the explosion by causing a groundwards force to be applied to the vehicle that depends upon the sensed mechanical deformation.

According to various, but not necessarily all, embodiments of the invention there is provided an apparatus comprising means for performing the method described above.

According to various, but not necessarily all, embodiments of the invention there is provided a sensor, comprising: at least one support; a first frangible electrical connection, for conveying an electrical signal, held by the at least one support at a first height and configured to enable a force to be detected via breakage of the first frangible electrical connection; and a second frangible electrical connection, for conveying an electrical signal, held by the at least one support at a second height different from the first height and configured to enable a force to be detected via breakage of the second frangible electrical connection.

According to various, but not necessarily all, embodiments of the invention there is provided a sensor, comprising: at least one support; a first frangible electrical connection, for conveying an electrical signal, held by the at least one support at a first height; and a second frangible electrical connection, for conveying an electrical signal, held by the at least one support at a second height different from the first height.

According to various, but not necessarily all, embodiments of the invention there is provided a printed wiring board, comprising: a first support arm; a second support arm; a first frangible electrical connection, for conveying an electrical signal between the first support arm and the second support arm, bridging the first support arm and the second support arm at a first height and enabling a force to be detected via breakage of the first frangible electrical connection; and a second frangible electrical connection, for conveying an electrical signal between the first support arm and the second support arm, bridging the first support arm and the second support arm at a second height different from the first height and enabling a force to be detected via breakage of the second frangible electrical connection.

According to various, but not necessarily all, embodiments of the invention there is provided a printed wiring board, comprising: a first support arm; a second support arm; a first frangible electrical connection, for conveying an electrical signal between the first support arm and the second support arm, bridging the first support arm and the second support arm at a first height; and a second frangible electrical connection, for conveying an electrical signal between the first support arm and the second support arm, bridging the first support arm and the second support arm at a second height different from the first height.

BRIEF DESCRIPTION

For a better understanding of various examples that are useful for understanding the brief description, reference will now be made by way of example only to the accompanying drawings in which.

DETAILED DESCRIPTION

Embodiments of the invention relate to sensing an explosion local to a vehicle and responding to the explosion by applying a groundwards force to the vehicle.

In this regard, the figures illustrate a vehicle 2, comprising: a sensor array 14 configured to detect an explosion by sensing, at different heights within a base 3 of the vehicle 2, mechanical deformation of the base 3 of the vehicle 2 caused by the explosion; and control circuitry 12 configured to respond to detection of the explosion by causing a groundwards force to be applied to the vehicle 2 that depends upon inputs, characterising the explosion, provided by the sensor array 14.

Figure 1:
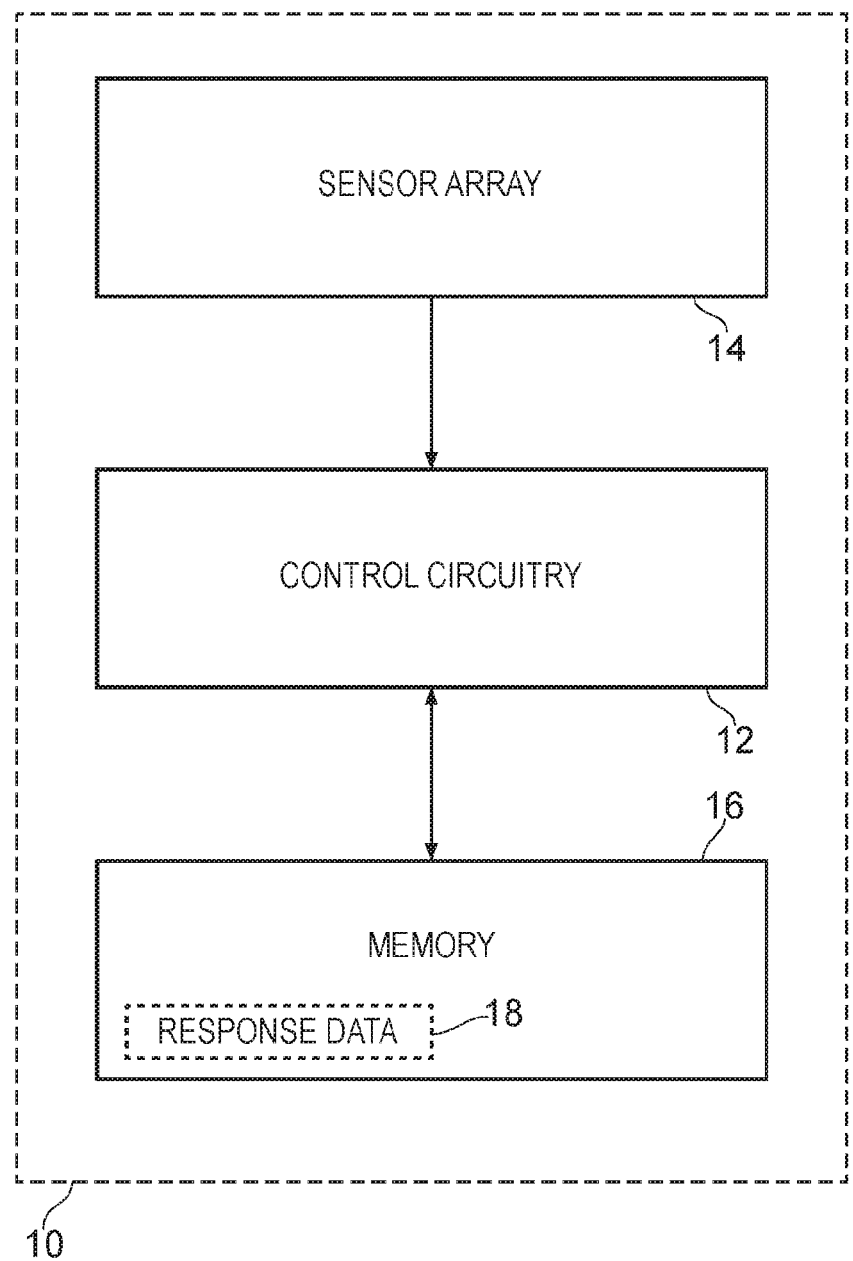
FIG. 1 illustrates a schematic of an apparatus.

FIG. 1 illustrates a schematic of an apparatus 10 for sensing an explosion local to a vehicle 2. The apparatus 10 may be applied to a vehicle during manufacture or post manufacture. The apparatus 10 may, for example, be a kit of parts. The vehicle 2 may be a land-based armoured vehicle. For example, the vehicle 2 may be a civilian car, a modified sports utility vehicle or a military armoured vehicle such as a personnel carrier or a tank.

The apparatus 10 comprises control circuitry 12, a sensor array 14 and at least one memory 16.

The sensor array 14 includes one or more sensors. The sensors may, for example, be positioned in a base 3 of a vehicle 2. This will be described in further detail below. The sensor array 14 is configured to detect an explosion by sensing, at different heights within the base 3 of a vehicle 2, mechanical deformation of the base 3 of the vehicle caused by the explosion.

The control circuitry 12 is configured to respond to detection of the explosion by causing a groundwards force to be applied to the vehicle that depends upon inputs, characterising the explosion, provided by the sensor array 14. In some examples, the control circuitry 12 may be dedicated, hardwired electronics. For instance, the control circuitry 12 may include one or more application specific integrated circuits (ASICs). Alternatively, in other examples, the control circuitry 12 may include one or more general purpose processors that operate in conjunction with a computer program.

The memory 16 is illustrated as a single component in FIG. 1, but it may be implemented as one or more separate components, some or all of which may be integrated/removable and/or may provide permanent/semi-permanent/dynamic/cached storage.

The memory 16 is illustrated in FIG. 1 as storing response data 18. The response data 18 may specify how the control circuitry 12 is to respond to various different inputs provided by the sensor array 14. For example, a vehicle 2 may comprise one or more vehicle stabilising devices that are configured to stabilise the vehicle 2 in response to an explosion local to the vehicle 2. The vehicle stabilising devices may be configured to apply a groundwards force to a vehicle in order to stabilise it. The vehicle stabilising devices may, for example, comprise one or more rocket motors and/or one or more ballistic devices.

The response data 18 may indicate how the control device 12 is to control the vehicle stabilising devices, in response to particular inputs from the sensor array 14, in order to stabilise the vehicle.

In circumstances where the control circuitry 12 includes one or more processors that operate in accordance with a computer program, the computer program may be stored in the memory 16.

Figure 2:
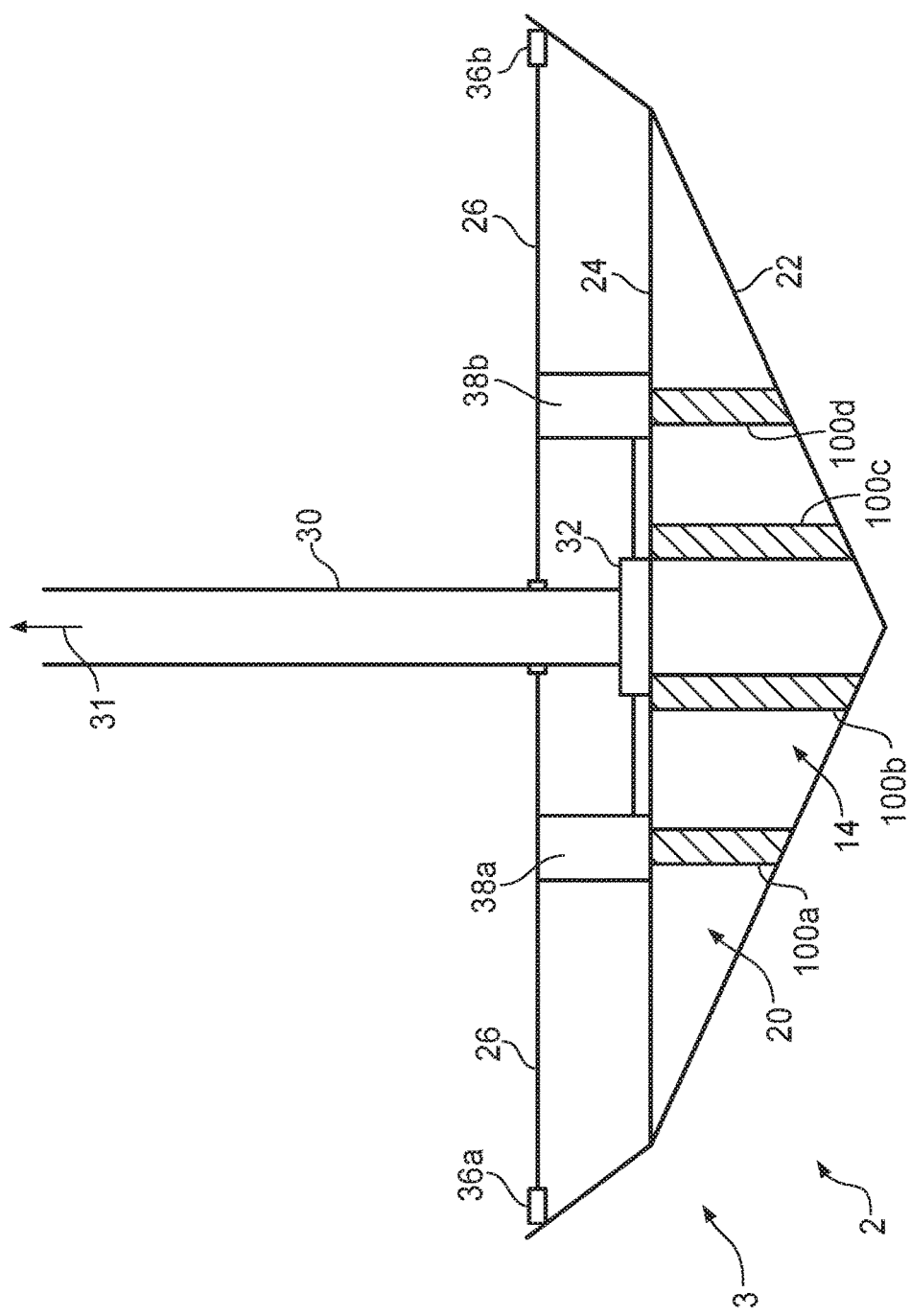
FIG. 2 illustrates an example of a cross section of a base of a vehicle.

FIG. 2 illustrates an example of a cross section of a base 3 of a vehicle 2. In this example, the vehicle 2 is an armoured vehicle and the base 3 of the vehicle 2 includes a V-shaped hull. The vehicle 2 comprises an upper armoured layer/belly plate 24 and a lower armoured layer/belly plate 22. In this particular example, the upper belly plate 24 is substantially flat and the lower belly plate 22 is V-shaped.

An energy absorbent, crushable material 20 is positioned between the upper belly plate 24 and the lower belly plate 22. The material 20 may, for example, comprise a plurality of elongate cells which extend from the upper belly plate to the lower belly plate. Each cell may, for instance, have a hexagonal cross section.

The sensor array 14 is also positioned between the upper belly plate 24 and the lower belly plate 22. In the example illustrated in FIG. 2, the sensor array 14 includes a plurality of sensors 100a, 100b, 100c, 100d distributed across the base 3 of the vehicle 2 within the energy absorbent, crushable material 20. In this particular example, each sensor 100a, 100b, 100c, 100d extends from the upper belly plate 24 and the lower belly plate 22, although this need not necessarily be the case in every example.

Resilient supports 38a, 38b support the floor 26 of the vehicle 2 above the upper belly plate 24. Resilient mounts 36a, 36b couple the floor 26 to the side structure of the vehicle 2. The resilient supports 38a, 38b and the resilient mounts 36a, 36b, may be wholly or partially made from rubber.

In the example illustrated in FIG. 2, an elongate vehicle stabilising device 30, in the form of a column, extends through the floor 26 and is coupled to the upper belly plate 24 by one or more reinforcing plates 32. The vehicle stabilising device 30 is configured to generate a groundwards force. If the vehicle stabilising device 30 is a ballistic device, the groundwards force is generated by ejecting one or more projectiles in the direction illustrated by the arrow labelled with the reference numeral 31 in FIG. 2, which causes an equal and opposite force to be generated towards ground. If the vehicle stabilising device 30 is a rocket motor, the groundwards force is generated by ejecting gas in the direction illustrated by the arrow 31 in FIG. 2.

Figure 3:
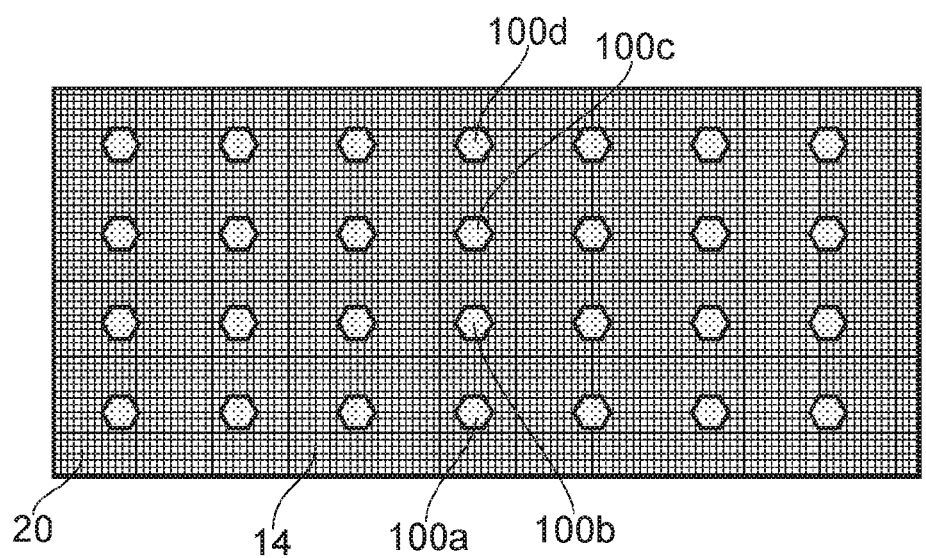
FIG. 3 illustrates a sensor array within the base of the vehicle.

FIG. 3 illustrates a horizontal section of the base 3 of the vehicle 2 through the energy absorbent, crushable material 20. In the example illustrated in FIG. 3, the sensor array 14 consists of 28 sensors but, in other examples, the sensor array 14 may include more or fewer sensors.

Figure 4:
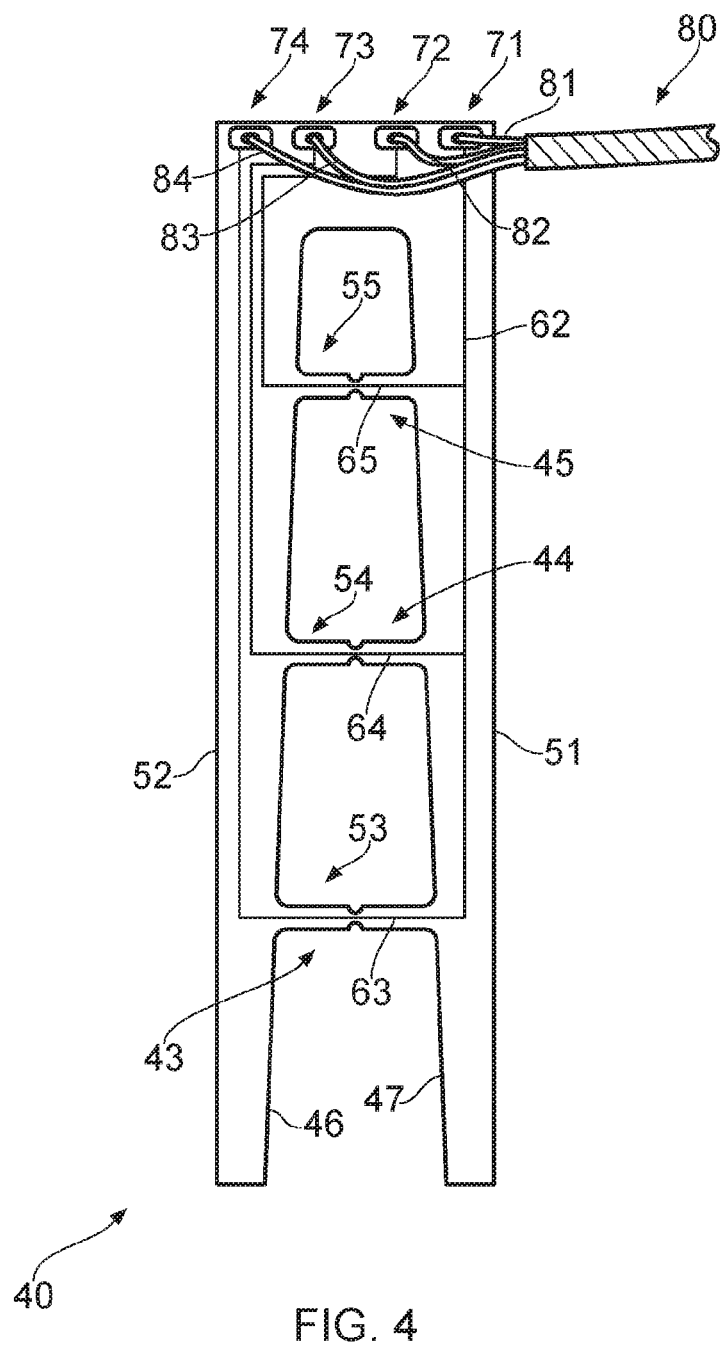
FIG. 4 illustrates a printed wiring board.

FIG. 4 illustrates a printed wiring board (PWB) 40. In a first implementation, the illustrated PWB 40 is a component of each of the sensors 100a, 100b, 100c, 100d which form the sensor array 14. The PWB 40 is made, at least in part, from a plastics material and is relatively rigid in nature. It provides a support for a plurality of electrical traces 62-65 etched into the PWB 40. In this regard, the PWB 40 comprises a first support arm 51 and a second support arm 52.

First, second and third bridges 53, 54, 55 bridge the first support arm 51 and the second support arm 52 at different heights. The PWB 40 includes four electrical connectors 71-74 at the top. An electrical trace 62 extends from a first electrical connector 71, along the first support arm 51 and splits into three further traces 63, 64, 65 at various positions along the first support arm 51. Each of the further traces 63, 64, 65 runs across a bridge 53, 54, 55 which is positioned across the first and second support arms 51, 52.

The first and second support arms 51, 52 have inner edges 46, 47 which taper inwardly from the bottom of the PWB 40 towards the top. This means that there is a larger gap between the first and second support arms 51, 52 where the first bridge 53 bridges the support arms 51, 52 than where the second bridge 54 bridges the support arms 51, 52. The first bridge 53 is therefore longer than the second bridge 54.

Similarly, there is a larger gap between the first and second support arms 51, 52 where the second bridge 54 bridges the support arms 51, 52 than where the third bridge 55 bridges the support arms 51, 52. The second bridge 54 is therefore longer than the third bridge 55.

The first, second and third bridges 53-55 and their respective traces 63-65 provide first, second and third frangible electrical connections 43, 44, 45 for conveying electrical signals between the first support arm 51 and the second support arm 52.

After crossing the bridges 53, 54, 55, each of the further traces 63-65 extends up the second support arm 52 to a different electrical connector 72, 73, 74 at the top of the PWB 40. It can be seen from FIG. 4 that the trace 65 which extends across the uppermost, third, bridge 55 runs inside the other traces 63, 64 on the second support arm 52 (that is, it is closer to the first support arm 51 than the other traces 63, 64). It can also be seen that the trace 63 which extends across the lowermost, first, bridge 53 runs outside the other traces 64, 65 on the second support arm 52 (that is, it is further from the first support arm 51 than the other traces 64, 65). The configuration of the traces 63, 64, 65 enables each trace 63, 64, 65 be electrically connected to a different connector 72-74 at the top of the PWB 40. Each of the electrical connectors 72-74 is electrically connected to the control circuitry 12 and the presence (or absence) of an electrical signal on each trace 63-65 can be monitored by the control circuitry 12.

In the illustrated example, an electrical cable 80 is shown which includes a first wire 81, for providing an electrical signal to the printed wiring board 40, and second, third and fourth wires 72, 73, 74 which connect (direct or indirectly) to the control circuitry 12 to enable it to monitor the frangible electrical connections 43-45 of the PWB 40.

In operation, the control circuitry 12 causes an electrical signal to be provided to the PWB 40 via the first wire 71 in the cable 80. The electrical signal travels down the electrical trace 62 in the first support arm 51 and crosses the bridges 53-55 via the electrical traces 63-65 across those bridges 53-55. The control circuitry 12 monitors the presence of the electrical signals along the traces 63-65 using the electrical connectors 72-74 and the second, third and fourth wires 82-84 in the cable 80.

In the event that a force is applied to one or more of the frangible electrical connections 43-45 which is of a sufficient magnitude to cause one or more of those electrical connections 43-45 to break, this is indicated to the control circuitry 12 through the absence of a signal at the relevant electrical connector 72-74. Thus, each of the frangible electrical connections 43-45 can be considered to be configured to enable a force which has a magnitude above a particular threshold to be detected via breakage of that frangible electrical connection 43-45.

Figure 6:
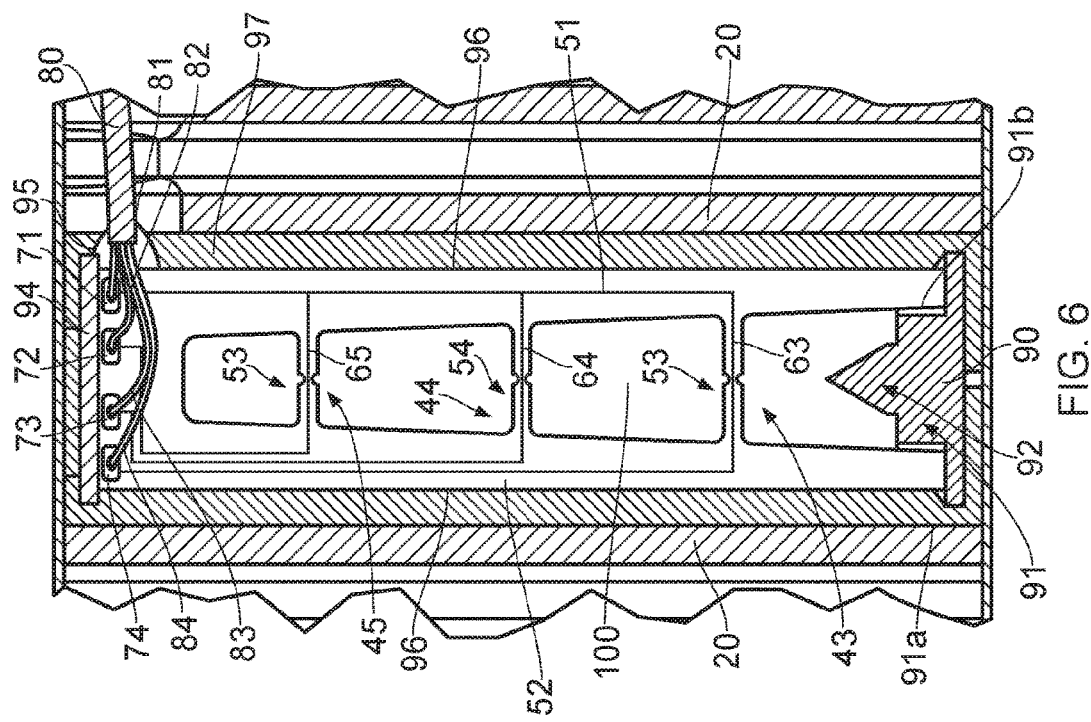
FIG. 6 illustrates a second cross sectional view of the sensor illustrated in FIG. 5.
Figure 5:
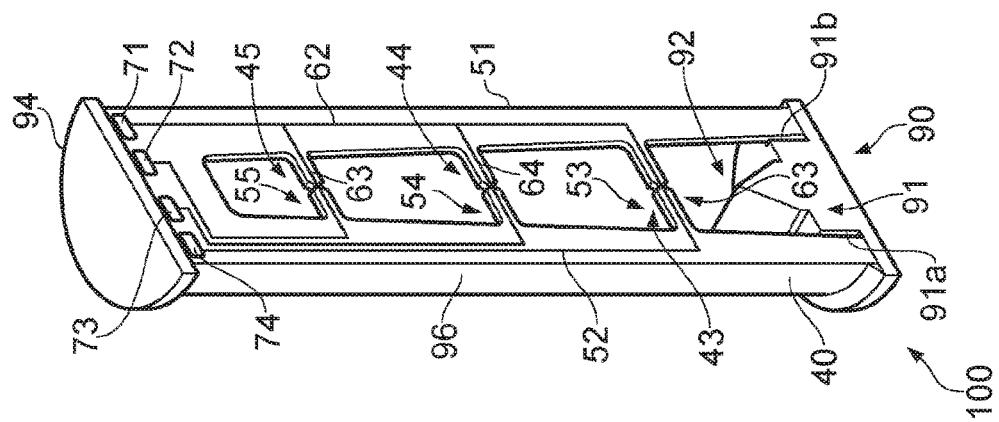
FIG. 5 illustrates a first cross sectional view of a first implementation of a sensor which includes the printed wiring board illustrated in FIG. 4.
Figure 7:
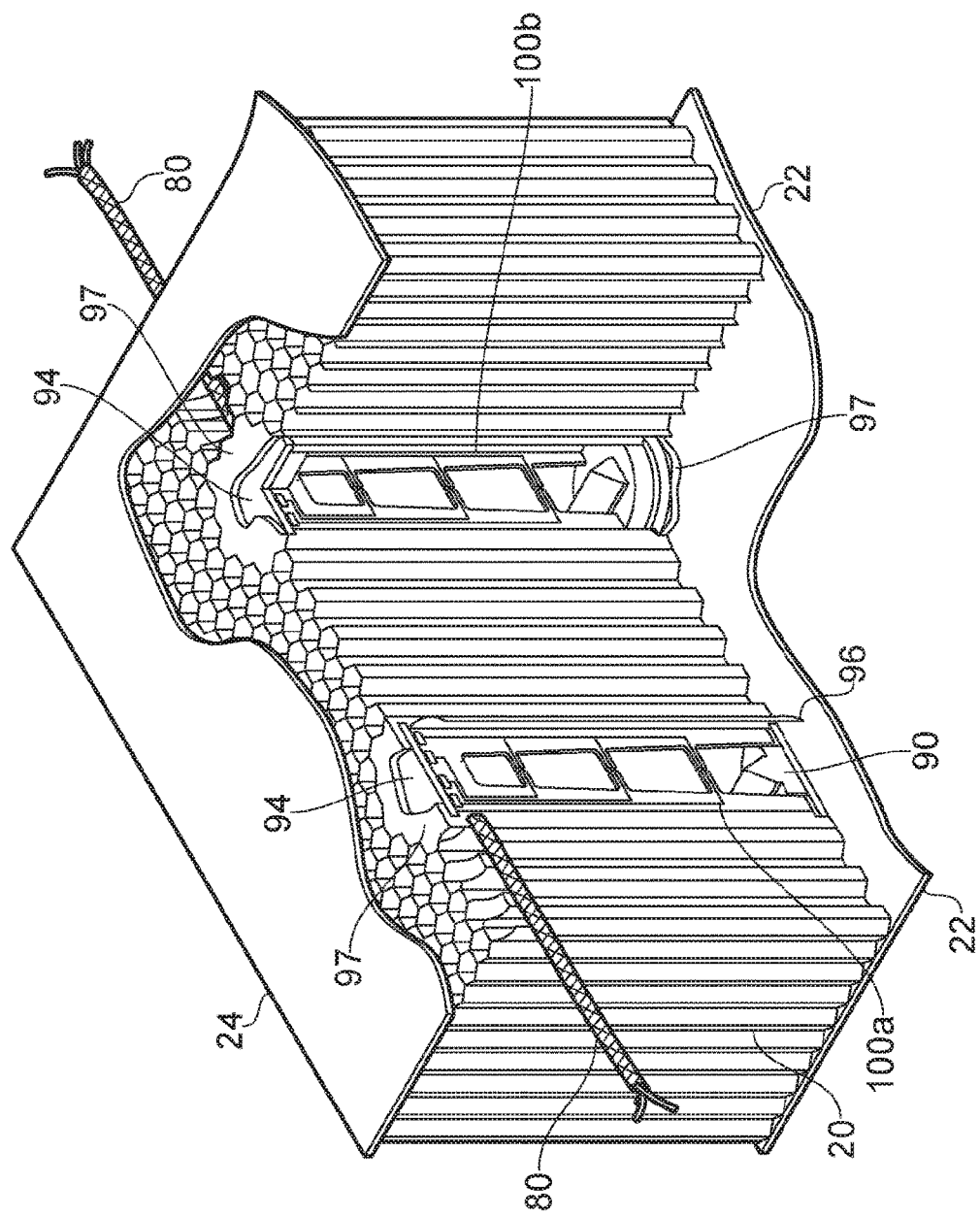
FIG. 7 illustrates two sensors, formed according to the first implementation, in situ in the base of a vehicle.

The PWB 40 illustrated in FIG. 4 forms part of a sensor 100 illustrated in FIGS. 5, 6 and 7. The sensor 100 illustrated in FIG. 4 is an example of the sensors 100a, 100b, 100c and 100d illustrated in FIGS. 2 and 3 and described above.

FIG. 5 illustrates a cross sectional view of the sensor 100. The sensor 100 comprises an outer housing 96 which, in this example, is in the form of a tube. The housing 96 houses the PWB 40 and is made from a crushable electrical insulator, such as glass fibre reinforced resin or plastic. The housing has an upper opening and a lower opening. An upper end cap 94 covers the upper opening.

The sensor 100 further comprises a cutter 92 which is positioned on an interior surface of a lower end cap 90 covering the lower opening of the housing 96. The cutter 92 extends upwardly towards the first, second and third frangible electrical connections 43-45.

The lower end cap 90 has a base 91 with a plurality of slots 91a, 91b, in which the ends of the support arms 51, 52 of the PWB 40 sit. The cutter 92 is positioned to cut the first, second and third frangible electrical connections 43-45 sequentially. If an upwards force is applied to the lower end cap 90, it forces the cutter 92 upwards towards the first, second and third frangible electrical connections 43-45. The distance between the tapered inner edges 46, 47 of the first and second support arms 51, 52 should be sufficiently large from the bottom of the sensor 100 (beneath the first frangible electrical connection 53) through to the top of the sensor 100 (at or close to the third frangible electric connection 55) so as not to restrict the upwards movement of the base 91 and the cutter 92 from their original position (as shown in FIGS. 5 and 6) to the third frangible electrical connection 55.

The force generated by an explosion may cause the housing 96 of the sensor 100 to crush. However, since the housing 96 is an electrical insulator, it does not cause inadvertent electrical connections to be made after the frangible electrical connections 43-45 have been broken, which helps to prevent the sensor array 14 from providing a misreading to the control circuitry 12.

In the FIG. 6 illustration, the sensor 100 comprises an encapsulant which encapsulates the housing 96 and the end caps 92, 94 of the sensor 100. The encapsulant 97 may prevent or mitigate the ingress of water into the sensor 100. The encapsulant 97 may, for example, be made from RTV (room temperature vulcanizing) silicone rubber. FIG. 6 illustrates the sensor 100 positioned in the energy absorbent, crushable material 20 referred to above in relation to FIGS. 2 and 3.

FIG. 7 illustrates two sensors 100a, 100b, which each include the PWB, in situ in the base 3 of a vehicle 2. In this example, the sensors 100 extend from the lower belly plate 22 of the vehicle 2 to the upper belly plate 24 of the vehicle 2. In some embodiments, all of the sensors in the base 3 of a vehicle 2 are the same and are therefore of the same height. In other embodiments, different sensors may be of different heights.

In some embodiments, spacers may be included in the energy absorbent, crushable material 20 to position the sensors within that material 20. For example, this may enable the sensors to be positioned at the same height within the base 3 for vehicles with a V-shaped hull, such as that illustrated in FIG. 2.

Figure 8:
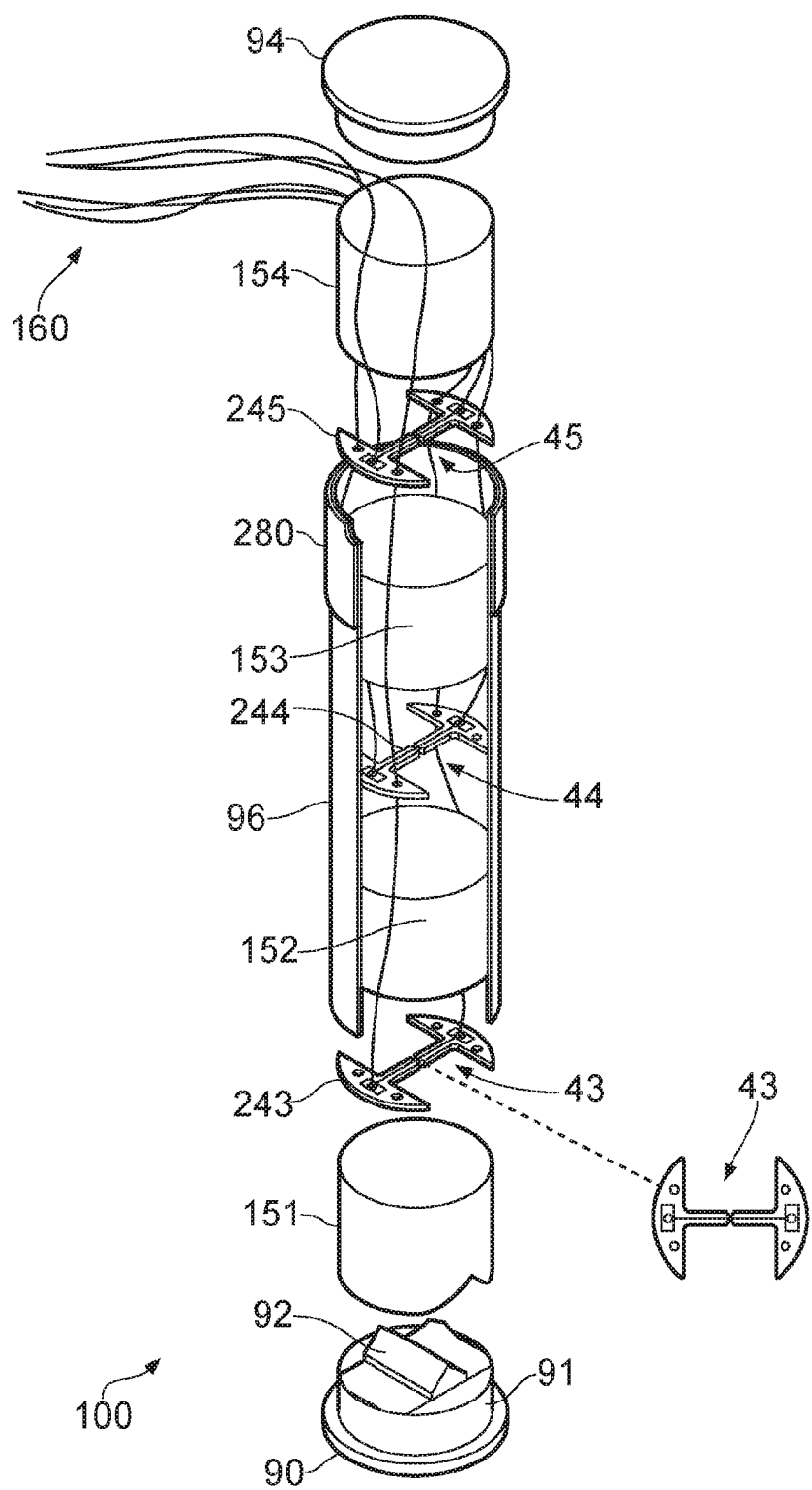
FIG. 8 illustrates an exploded view of a second implementation of the sensor.

FIG. 8 illustrates a second implementation of a sensor 100 in the sensor array, which differs from the first implementation described above in relation to FIGS. 4 to 7. The second implementation of the sensor 100 is similar to the first implementation in that, in both the first and second implementations, the sensor 100 includes at least one support, and first, second and third frangible electrical connections 43, 44, 45. Also, in both the first and the second implementations, the first frangible electrical connection 43 is held by the at least one support at a first height and is configured to enable a force to be detected via breakage of the first frangible electrical connection 43, the second frangible connection 44 is held by the at least one support at a second height and is configured to enable a force to be detected via breakage of the second frangible electrical connection 44, and the third frangible electrical connection 45 is held by the at least one support at a third height and is configured to enable a force to be detected via breakage of the third frangible electrical connection 45.

The second implementation of the sensor 100 formed according to the second implementation also includes the lower and upper end caps 90, 94 and the housing 92 described above in relation to the first implementation and may also include the encapsulant 97. A fibre reinforced plastic collar 280 surrounding the housing 92 is also illustrated in FIG. 8, which could also be present in the first implementation.

The second implementation of the sensor 100 differs from the first implementation in terms of how each of the first, second and third frangible electrical connections 43, 44, 45 is formed and how they are supported at different heights. The frangible electrical connections 43-45 are each formed by a separate piece of PWB 243-245 in the second implementation. Each piece of PWB 243-245 could have any shape. In the illustrated example, each piece of PWB 243-245 resembles two anchor shapes which are joined at their shafts.

In the second implementation, multiple supports/spacers 151, 152, 153 are provided to support the frangible electrical connections 43, 44, 45 (provided by the PWBs 243-245) at different heights. A first support 151 holds the first frangible electrical connection 43 at a first height. A second support 44 holds the second frangible electrical connection 44 at a second height. A third support 45 holds the third frangible electrical connection 45 at a third height. A fourth support/spacer 154 spaces the third frangible electrical connection 45 from the upper end cap 94.

The supports 151, 152, 153 may be configured such that an increasingly large upwards force is required to be applied to the cutter 92 in order for the cutter 92 cut through each frangible electrical connection 43, 44, 45 as it travels upwards. That is, the second support 152 is more resistive to being cut by the cutter 92 than the first support 151, and the third support 153 is more resistive to being cut by the cutter 92 than the second support 152. Said differently, it may be that a force (in an upwards direction) of at least a first magnitude is required to be applied to the cutter 92 in order for the cutter 92 to cut through the first support 151 and break the first frangible connection 43, a force of at least a second magnitude is required to be applied to the cutter 92 (in the same upwards direction) in order for the cutter 92 to cut through the second support 152 and break the second frangible connection 44, and a force of at least a third magnitude is required to be applied to the cutter 92 (in the same upwards direction) in order for the cutter 92 to cut through the third support 153 and break the third frangible connection 45. The third magnitude may be greater than the second magnitude, which may in turn be greater than the first magnitude. In this regard, the material from which the third support 153 is made may be more dense than the material from which the second support 152 is made, and the material from which the second support 152 is made may be more dense than the material from which the first support 151 is made.

Each of the first, second, third and fourth supports 151-154 could be made from Rohacell, a polymethacyrlamide structural foam. The density of Rohacell used for each of the first, second and third supports 151-153 differs in the manner explained above. The density of the material used to form the fourth support 154 may be the same as that used to form the third support 151-153 or more dense.

FIG. 8 also illustrates wiring 160 which electrically connects each of the frangible electrical connections 43-45 to the control circuitry 12 to provide the functionality described above in relation to the first implementation. The wiring 160 includes: (i) wires which pass through apertures in the second and third PWBs 244, 245 and electrically connect the first PWB 243 to the control circuitry 12, (ii) wires which pass through the third PWB 245 and electrically connect the second PWB 244 to the control circuitry 12, and (iii) wires which electrically connect the third PWB 245 to the control circuitry 12.

Figure 9:
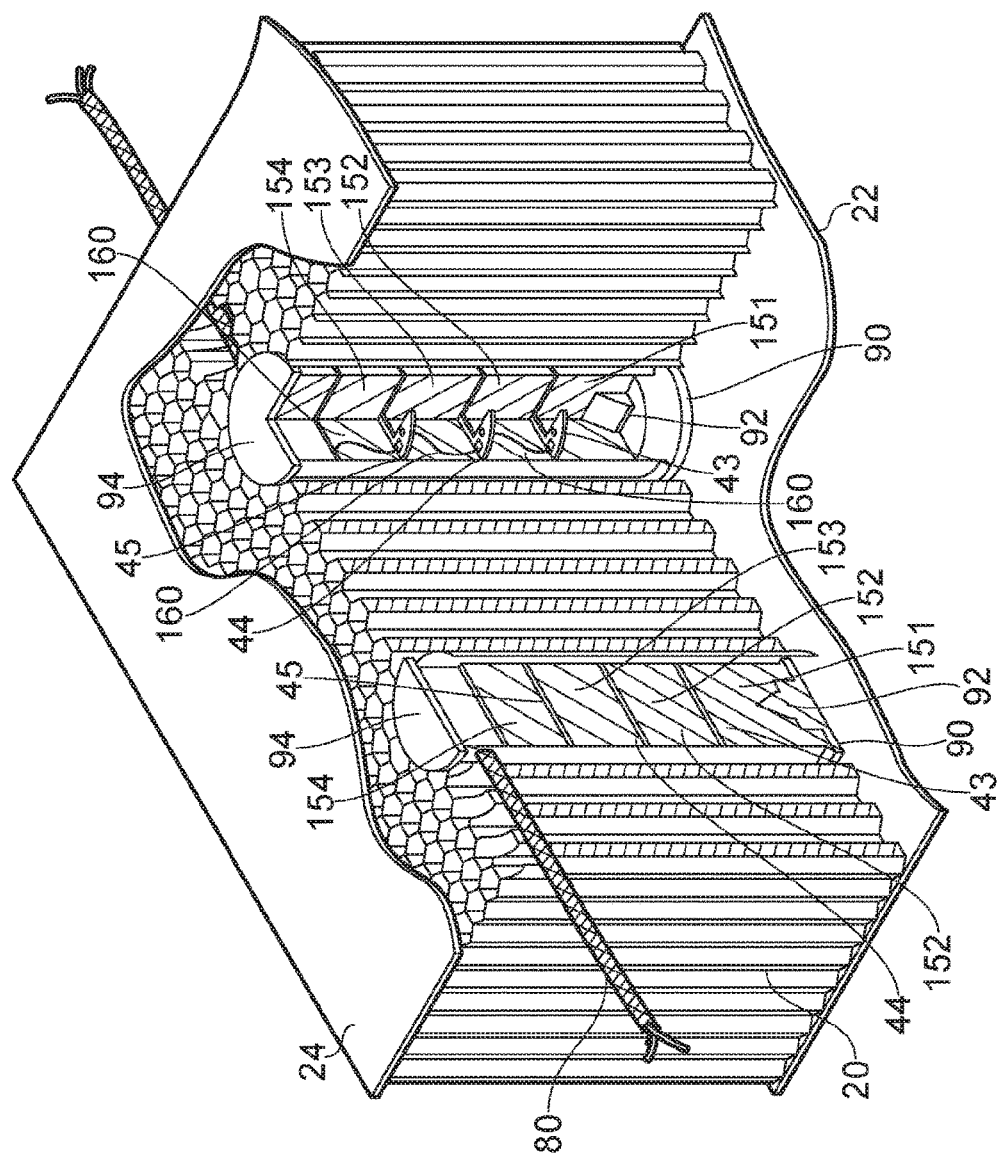
FIG. 9 illustrates two sensors, formed according to the second implementation, in situ in the base of a vehicle.

FIG. 9 illustrates two sensors 100a, 100b, formed according to the second implementation, in situ in the base 3 of a vehicle 2.

A method according to embodiments of the invention will now be described in relation to FIGS. 10,11 and 12. Initially, an explosion/detonation occurs local to a vehicle 2. The explosion may, for instance, be underneath a vehicle 2 and could, for example, be caused by a mine or an improvised explosive device (IED).

The initial shockwave formed by the explosion (and the fragments it carries) damage the lower belly plate 22 of the vehicle 2, deforming the belly plate 22. Some of the energy generated by the explosion is absorbed by the energy absorbent, crushable material 20 as it crushes in response to the force provided by the initial shockwave.

Figure 11:
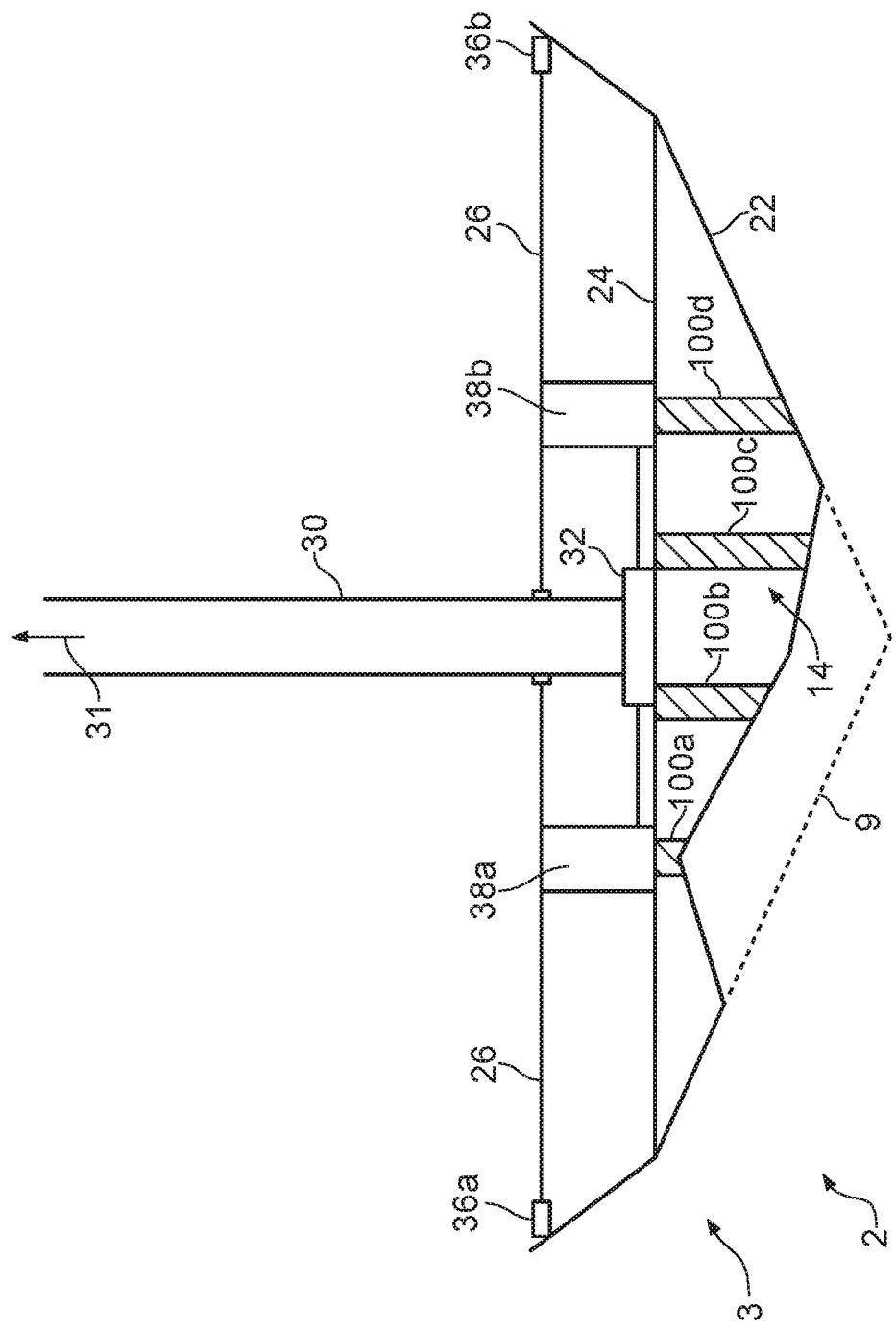
FIG. 11 illustrates a first example of the cross section of a base of a vehicle after an explosion has occurred underneath the vehicle.

FIG. 11 illustrates a first example of the cross section of a base 3 of a vehicle 2 after an explosion has occurred underneath the vehicle 2. The dotted line 9 illustrated in FIG. 11 illustrates the original position of the lower belly plate 22 before the explosion.

Figure 12:
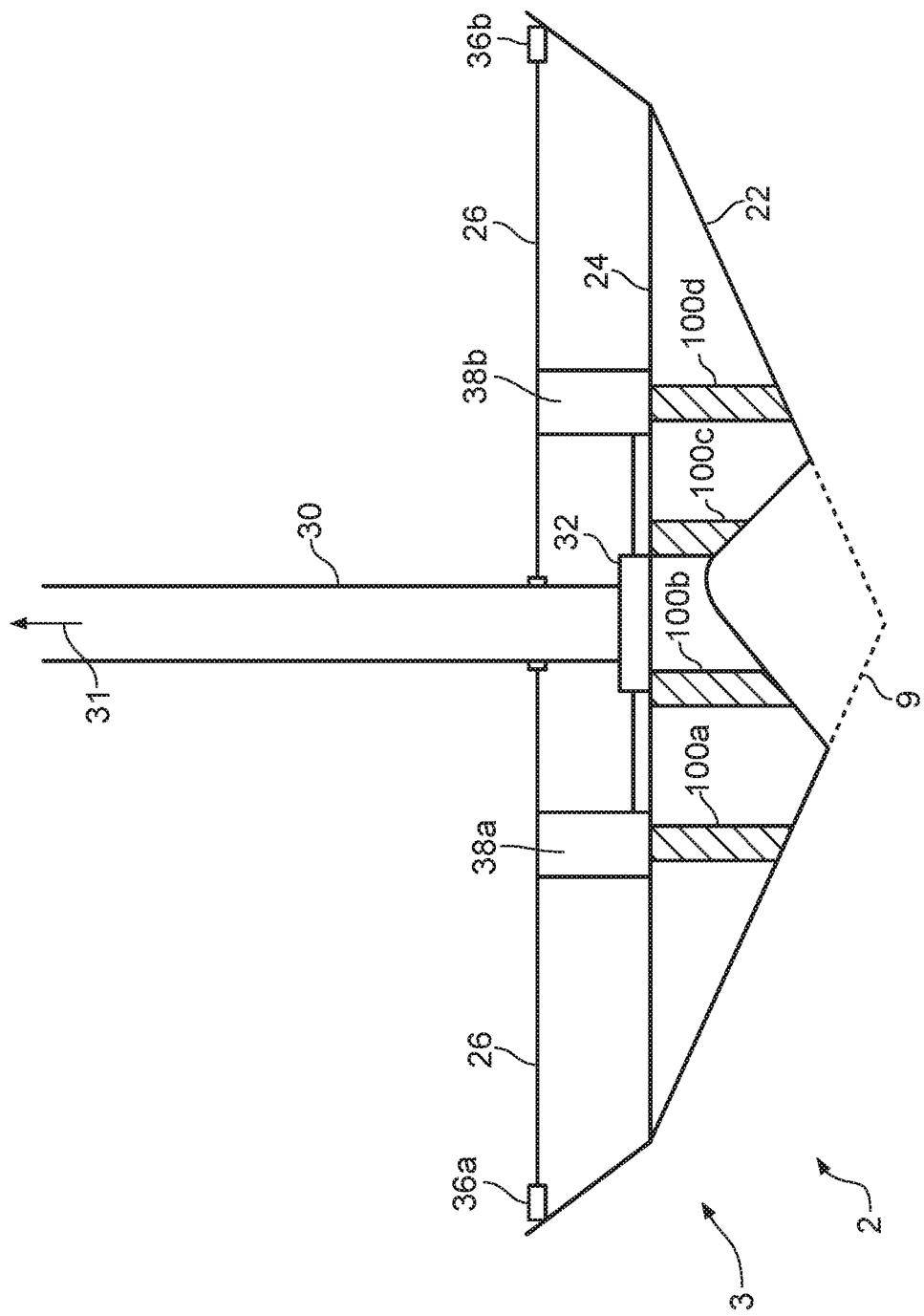
FIG. 12 illustrates a second example of the cross section of a base of a vehicle after an explosion has occurred underneath the vehicle.

FIG. 12 illustrates a second example of the cross section of a base 3 of a vehicle 2 after an explosion has occurred underneath the vehicle 2. Different explosions may have different effects on the base 3 of the vehicle 2. For example, the nature of the explosive (a mine, an IED, an explosively formed penetrator, etc.) and its size will have an effect on the damage that is caused to the base 3 of the vehicle 2. The dotted line 9 illustrated in FIG. 11 illustrates the original position of the lower belly plate 22 before the explosion.

Figure 10:
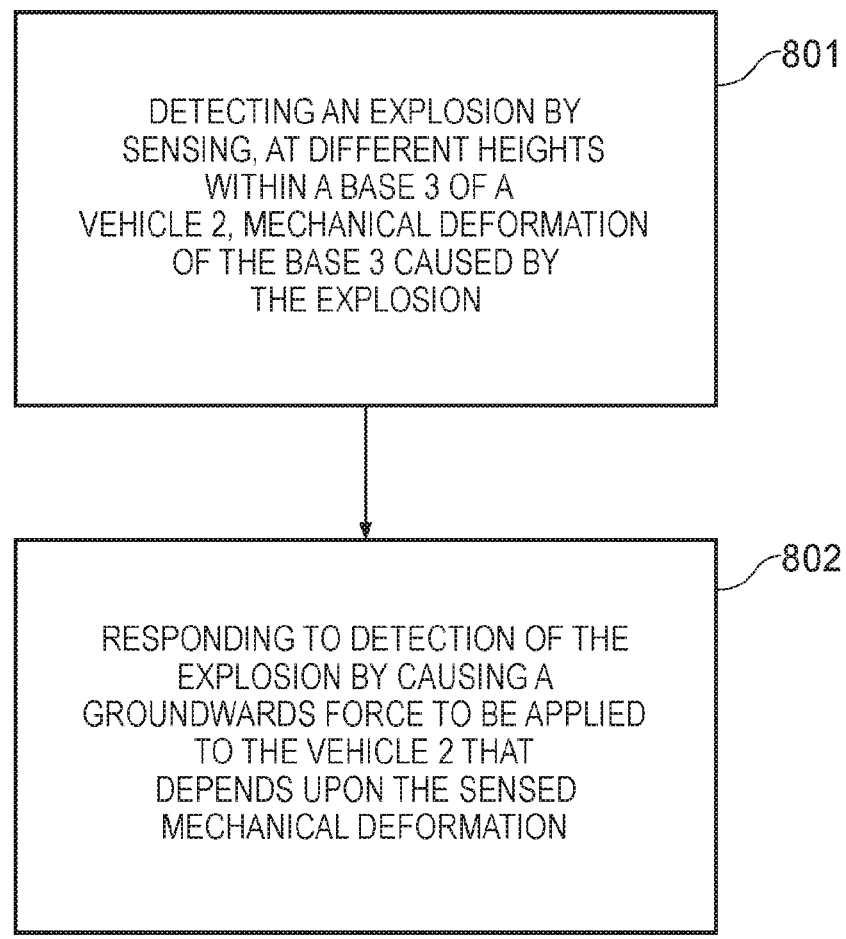
FIG. 10 illustrates a flow chart of a method.

At block 801 in FIG. 10, the sensor array 14 in the base 3 of the vehicle 2 detects the explosion by sensing, at different heights within the base 3 of the vehicle 2, mechanical deformation of the base 3 of the vehicle 2 caused by the explosion.

The force produced by the initial shockwave of the explosion may drive the cutter 92 upwards in one or more of the sensors of the sensor array 14. Depending upon the force applied to the cutter 92 in a sensor, the cutter 92 may: i) cut the first frangible electrical connection 43, ii) cut the first and second frangible electrical connections 43, 44, iii) cut the first, second, and third frangible electrical connections 43, 44, 45, or iv) cut none of the frangible electrical connections 43, 44, 45.

The sensor array 14 is able to sense the mechanical deformation of the base 3 of the vehicle 2 at different heights of the vehicle 2 because each sensor has frangible electrical connectors 43, 44, 45 located at different heights. Consequently, the inputs provided by the sensor array 14 can be considered to "characterise the explosion".

As mentioned above, the control circuitry 12 of the vehicle 2 monitors the sensors in the sensor array 14. The inputs provided by the sensors, with regard to which frangible electrical connections 43-45 have been broken and which have not, is indicative of the location at which the explosion has occurred and the direction and magnitude of the force resulting from it. In this regard, the inputs provided by the sensor array 14 can be used by the control circuitry 12 to form a three dimensional map of the damage which has been caused to the base 3 of the vehicle 2 by the explosion.

For example, the inputs provided by the sensor array 14 in the example illustrated in FIG. 11 indicate that the explosion is closer to one side of the vehicle 2 than the other. In the example illustrated in FIG. 11, inputs provided by the sensor array 14 indicate that the explosion is close to the centre of the vehicle 2. In areas where all three frangible electrical connections 43-45 have been broken in a sensor, the magnitude of the force is greater than where fewer of the frangible electrical connections 43-45 have been broken.

The control circuitry 12 may also monitor the rate at which the frangible electrical connections 43-45 are broken because this may be indicative of the magnitude of the force resulting from the explosion.

In the few milliseconds that follow the initial shockwave caused by the explosion, gases produced by decomposition of the explosive flowing from the mine expand underneath the vehicle 2 and together with other contributors (to the total impulse imparted to the vehicle 2) may apply a large enough force to cause the vehicle 2 to accelerate upwards into the air and fall onto its side or top. The effect of the expanding gases can be likened to a large airbag expanding very rapidly under the vehicle.

The upwards force that is generated by the expanding gases is at maximum for around 5 milliseconds or so, and then rapidly reduces in value over the next 5 milliseconds to near zero. The total time over which a particularly significant upwards force is exerted on the vehicle might generally be around 20-30 milliseconds. In some circumstances it can be as long as 500 milliseconds or so.

At block 802 in FIG. 10, the control circuitry 12 responds to the detection of the explosion by causing a groundwards force to be applied to the vehicle 2. The groundwards force either prevents or mitigates upwards movement of the vehicle 2 from the ground and depends upon the inputs, characterising the explosion, provided by the sensor array 14.

In order to do this, the control circuitry 12 compares the inputs received from the sensor array 14 with the response data 18 in the memory 16. The response data 18 may, for example, indicate which vehicle stabilising devices of the vehicle 2 should be activated, for particular input patterns received from the sensor array 14, in order to provide a groundwards force that is appropriately directed and of an appropriate magnitude.

In the context of the example illustrated in FIGS. 2, 11 and 12, the control circuitry 12 may control the vehicle stabilizing device 30 to provide the groundwards force, in order to stabilise the vehicle 2 in response to the explosion.

Figure 13:
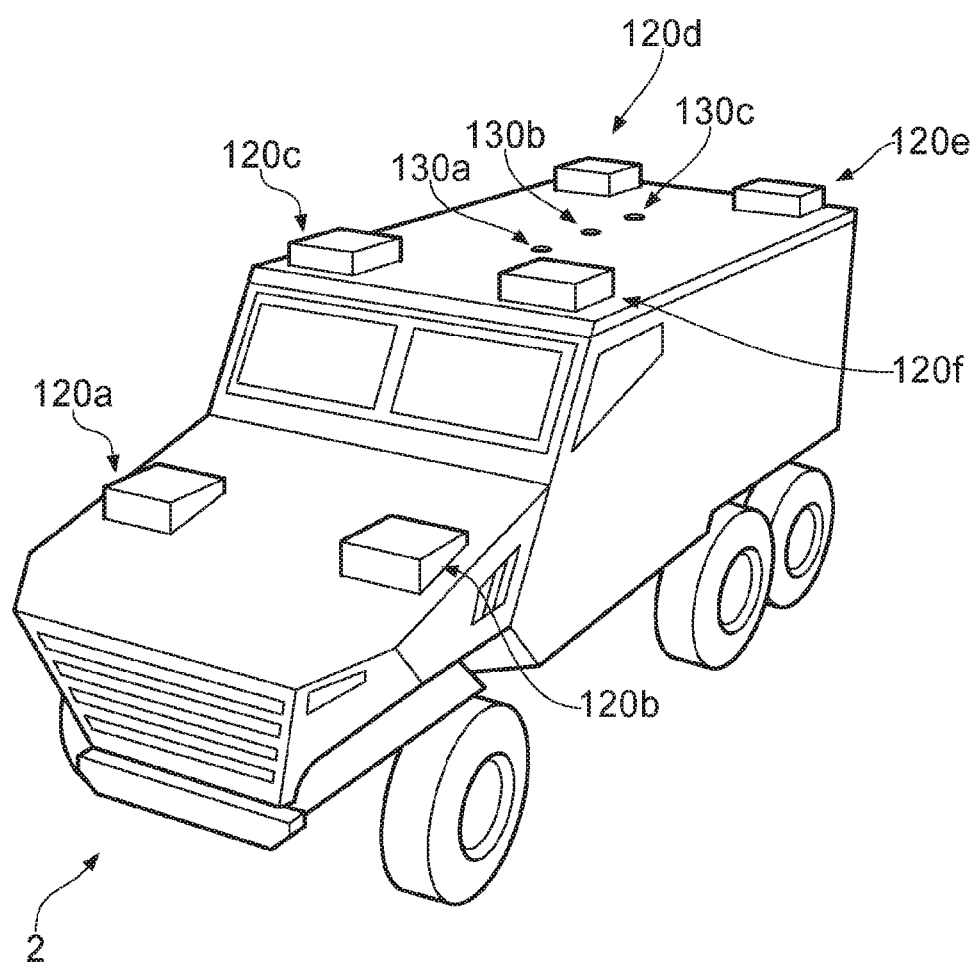
FIG. 13 illustrates a perspective view of a vehicle.

FIG. 13 illustrates a further example of the vehicle 2. In this example, the vehicle 2 comprises multiple vehicle stabilizing devices 120*a*-120*f* positioned on the bonnet (hood) of the vehicle 2 and the roof of the vehicle 2. The illustrated vehicle stabilising devices 120*a*-120*f* are supported by structural links to the chassis and/or suspension hard points of the vehicle 2. The vehicle 2 also comprises three internal vehicle stabilizing device 130*a*, 130*b*, 130*c*, each of which are the same or similar to the vehicle stabilising device 30 illustrated in FIG. 2.

The distribution of the vehicle stabilising devices 130*a-c*, 120*a*-120*f* around the vehicle 2 enables a groundwards force to be generated that is perpendicular to ground, or oblique to ground.

The internal vehicle stabilizing devices 130*a*-130*c* may, for example, be ballistic devices that eject projectiles into the air to produce a high magnitude, short duration force in order to counteract the initial high magnitude force produced from an explosion local to the vehicle 2. The outer apertures of the internal vehicle stabilising devices 130*a*, 130*b*, 130*c* can be seen on the roof of the vehicle 2 in FIG. 13. These apertures enable the internal vehicle stabilising devices 130*a*, 130*b*, 130*c* to eject projectiles from the vehicle 2.

The external vehicle stabilising devices 120*a*-120*f* may be rocket motors which are configured to produce a longer duration, smaller magnitude force. Together, the internal vehicle stabilising devices 130*a*-130*c* and the external vehicle stabilising devices 120*a*-120*f* enable a groundwards impulse to be produced that mirrors the upwards impulse provided by the explosion, over time.

The control circuitry 12 may activate some or all of the vehicle stabilizing devices 130*a*-130*c*, 120*a*-120*f* in response to an explosion. Whether or not particular vehicle stabilising devices 130*a*-130*c*, 120*a*-120*f* are activated depends upon the nature of the explosion (e.g. the position of the explosion relative to the vehicle 2, and the upwards force it produces).

Figure 14:
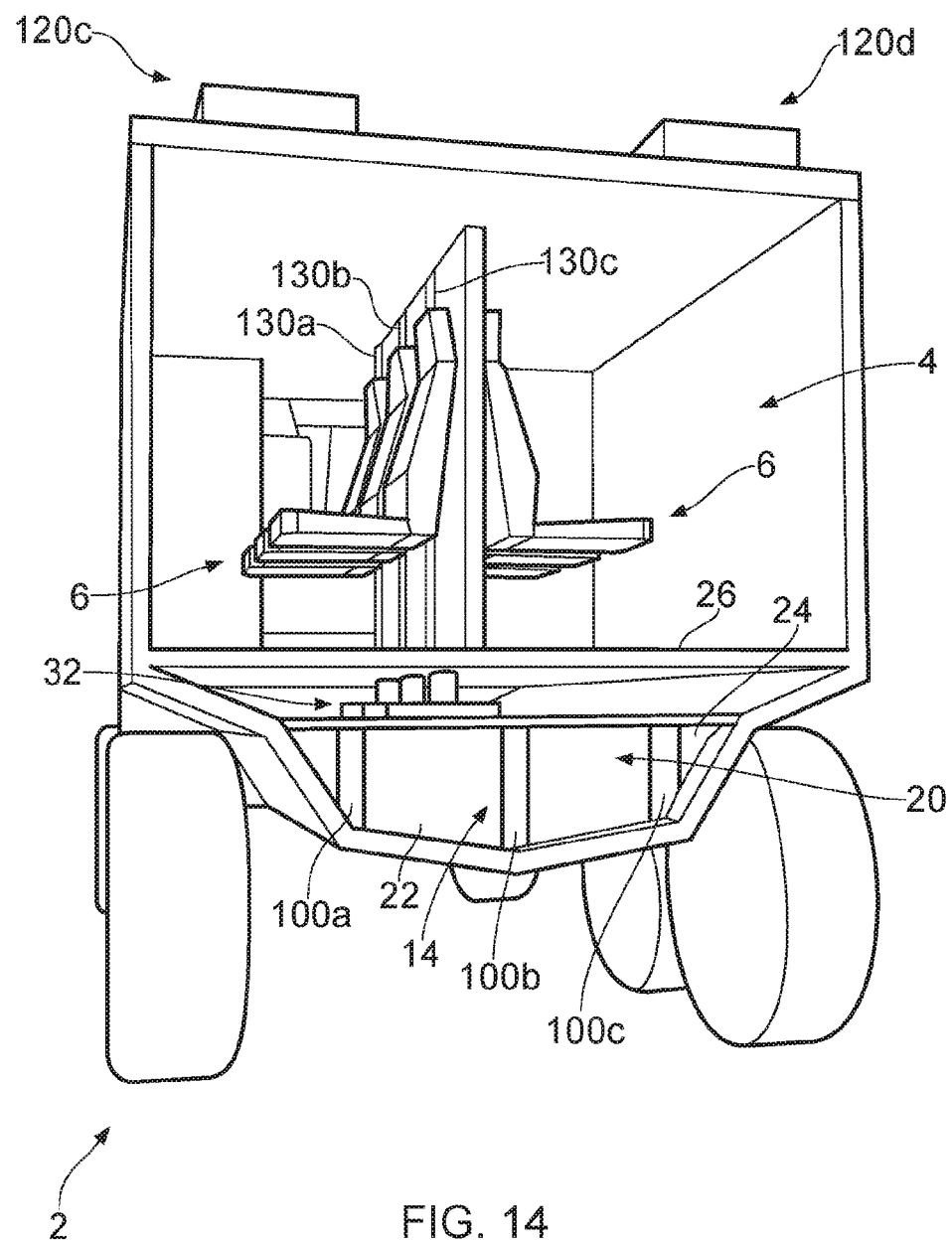
FIG. 14 illustrates a rear view of a vehicle.

FIG. 14 illustrates a rear view of the vehicle 2 illustrated in FIG. 11 in which an internal compartment 4 for housing occupants of the vehicle 2 and the base 3 are visible. Seats 6 for occupants are illustrated.

A method and apparatus 10 for sensing and responding to an explosion local to a vehicle 2 has been described above. The sensor array 14 described above advantageously provides a robust and reliable means of sensing an explosion, even when a vehicle 2 is in testing operational conditions. Since the sensor array 14 provides inputs to the control circuitry 12 which are indicative of the position and magnitude of an explosion, it is possible for the control circuitry 12 to assess the direction and magnitude of the explosion and cause the generation of a groundwards force to counteract it which is of an appropriate force and magnitude, keeping the vehicle 2 upright and in fighting condition.

The blocks illustrated in the FIG. 10 may represent steps in a method and/or sections of code in a computer program. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed. For example, the vehicle 2 may have more or fewer vehicle stabilising devices 130*a*-130*c*, 120*a*-120*f* and/or more or fewer sensors in the sensor array 14 than those described above and illustrated in the figures. Each sensor in the sensor array 14 could have more or fewer frangible electrical connections 43-45 than those illustrated in the figures.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

The invention claimed is:

1. A vehicle, comprising:
a sensor array configured to detect an explosion by sensing, at different heights within a base of a vehicle, mechanical deformation of the base of the vehicle caused by the explosion; and
control circuitry configured to;
form, using inputs provided by the sensor array, a three-dimensional map of damage which has been caused to the base of the vehicle; and
respond to detection of the explosion by causing a groundwards force to be applied to the vehicle that depends upon the three-dimensional map of damage formed from the inputs provided by the sensor array.

2. The vehicle as claimed in claim 1, wherein the sensor array comprises a plurality of sensors, wherein each sensor from the plurality of sensors comprises multiple frangible electrical connections, positioned at different heights, for use in detecting mechanical deformation of the base of the vehicle at different heights.

3. The vehicle as claimed in claim 2, wherein each sensor from the plurality of sensors comprises a cutter for cutting the multiple frangible electrical connections in response to a force from an explosion.

4. The vehicle as claimed in claim 3, wherein the cutter is positioned to cut the multiple frangible electrical connections sequentially.

5. The vehicle as claimed in claim 4, wherein each sensor from the plurality of sensors comprises at least a first support and a second support, the multiple frangible electrical connections comprises at least a first frangible electrical connection and a second frangible electrical connection, wherein the first support is arranged to hold the first frangible electrical connection at a first height and the second support is arranged to hold the second frangible electrical connection at a second height, and the cutter is arranged to cut through the first support prior to cutting the first frangible electrical connection and arranged to cut through the second support prior to cutting the second frangible electrical connection.

6. The vehicle as claimed in claim 5, wherein the second support is configured to be more resistive to being cut than the first support.

7. The vehicle as claimed in claim 5, wherein the second support is made from a denser material than the first support.

8. The vehicle as claimed in claim 5, wherein the first frangible electrical connection is provided by a first printed wiring board, and the second frangible electrical connection is provided by a second printed wiring board that is different from the first printed wiring board.

9. The vehicle as claimed in claim 3, wherein the cutter comprises a pointed end directed towards the multiple frangible electrical connections.

10. The vehicle as claimed in claim 2, wherein the frangible electrical connections are housed by a housing formed from an electrical insulator.

11. The vehicle as claimed in claim 10, wherein the housing is encapsulated by an encapsulant that is configured to prevent the ingress of water into the housing.

12. The vehicle as claimed in claim 11, wherein the housing of each sensor is located in a cavity in energy absorbent crushable material.

13. The vehicle as claimed in claim 12, wherein each sensor and the energy absorbent crushable material are located between a first belly plate and a second belly plate.

14. The vehicle as claimed in claim 2, wherein the multiple frangible electrical connections are provided by electrical traces in one or more printed wiring boards.

15. The vehicle as claimed in claim 2, wherein the control circuitry is configured to monitor a rate at which the multiple frangible electrical connections in each sensor are broken.

16. The vehicle as claimed in claim 1, wherein the sensor array comprises a plurality of sensors, each sensor from the plurality of sensors being configured to sense mechanical deformation of the base of the vehicle at different heights within the base of the vehicle, wherein the vehicle further comprises a belly plate, and each sensor from the plurality of sensors is located in a cavity in a crushable material situated above the belly plate.

17. The vehicle as claimed in claim 1, wherein the vehicle further comprises a plurality of vehicle stabilizing devices arranged to apply a groundwards force to the vehicle, and the control circuitry is further configured to use the three-dimensional map of damage to determine which vehicle stabilizing device or vehicle stabilizing devices to activate, from the plurality of vehicle stabilizing devices, in order to provide a groundwards force that is appropriated directed and/or of an appropriate magnitude.

18. The vehicle as claimed in claim 1, wherein the vehicle further comprises a plurality of rocket motors arranged to apply a groundwards force to the vehicle, and the control circuitry is further configured to use the three-dimensional map of damage to determine which rocket motor or rocket motors to activate, from the plurality of vehicle stabilizing devices, in order to provide a groundwards force that is appropriated directed and/or of an appropriate magnitude.

19. The vehicle as claimed in claim 1, wherein the sensor array comprises a plurality of sensors, distributed along a length of the base of the vehicle and distributed across a width of the base of the vehicle, wherein each sensor from the plurality of sensors is configured to sense, at different heights within a base of a vehicle, mechanical deformation of the base of the vehicle caused by the explosion.

20. A method, comprising:
detecting an explosion by using a sensor array to sense, at different heights within a base of a vehicle, mechanical deformation of the base of the vehicle caused by the explosion;
forming, using inputs provided by the sensor array, a three-dimensional map of damage which has been caused to the base of the vehicle by the explosion; and
responding to detection of the explosion by causing a groundwards force to be applied to the vehicle that depends upon the three-dimensional map of damage formed from the inputs provided by the sensor array.

21. A vehicle, comprising:
a sensor array configured to detect an explosion by sensing, at a plurality of positions along a length of a base of the vehicle and across a width of the base of the vehicle, a depth of mechanical deformation of the base of the vehicle caused by the explosion; and
control circuitry configured to:
form, using inputs provided by the sensor array, a three-dimensional map of damage which has been caused to the base of the vehicle; and
respond to detection of the explosion by causing a groundwards force to be applied to the vehicle that depends upon the three dimensional map of damage formed from the inputs provided by the sensor array.

22. The vehicle as claimed in claim 21, wherein the sensor array is configured to sense, at a plurality of positions along a base of the vehicle and across the base of the vehicle, a depth of mechanical deformation of the base of the vehicle by sensing, at a plurality of positions along a base of the vehicle and across the base of the vehicle, mechanical deformation at different heights within the base.

* * * * *